(12) United States Patent
Ross (10) Patent No.: US 10,081,313 B1
(45) Date of Patent: Sep. 25, 2018

(54) CUP HOLDER ASSEMBLIES WITH CUP HOLDER BODIES INCLUDING LIQUID RELIEF DRAINS AND VEHICLES INCORPORATING SAME

(71) Applicant: TOYOTA MOTOR ENGINEERING & MANUFACTURING NORTH AMERICA, INC., Erlander, KY (US)

(72) Inventor: Andrew L. Ross, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/625,160

(22) Filed: Jun. 16, 2017

(51) Int. Cl.
*B60R 13/07* (2006.01)
*B60N 3/10* (2006.01)

(52) U.S. Cl.
CPC .............. *B60R 13/07* (2013.01); *B60N 3/102* (2013.01)

(58) Field of Classification Search
CPC .......... B60R 13/07; B60N 3/10; B60N 3/101; B60N 3/102; B60N 3/105–3/106; B60N 3/108
USPC ................................ 296/37.12, 24.34, 37.8; 297/188.01–188.21
See application file for complete search history.

(56) References Cited

U.S. PATENT DOCUMENTS

| | | | | |
|---|---|---|---|---|
| 3,223,127 A * | 12/1965 | Sidebottom | ............. | A47L 19/02 141/364 |
| 4,887,784 A * | 12/1989 | Kayali | .................. | B60N 3/102 248/231.51 |
| 4,953,771 A * | 9/1990 | Fischer | .................. | B60N 3/102 108/44 |
| 5,413,035 A | 5/1995 | Fernandez | | |
| 5,524,958 A * | 6/1996 | Wieczorek | ............... | A47C 7/70 297/188.17 |
| 5,673,891 A * | 10/1997 | Fujihara | ................. | B60N 3/102 248/311.2 |
| 5,823,410 A | 10/1998 | Ackeret | | |
| 5,857,633 A * | 1/1999 | Pelchat, II | ............. | B60N 3/102 224/926 |
| 7,140,660 B2 * | 11/2006 | Oana | ...................... | B60N 3/102 296/37.8 |
| 7,568,601 B2 * | 8/2009 | Kogami | ................. | B60N 3/102 220/345.1 |
| 8,210,589 B2 | 7/2012 | Penner et al. | | |
| 9,016,650 B2 | 4/2015 | Thurman et al. | | |
| 9,796,316 B1 * | 10/2017 | Siqueira | ................. | B60N 3/106 |
| 2016/0046233 A1 | 2/2016 | Hansen et al. | | |

* cited by examiner

*Primary Examiner* — Dennis H Pedder
(74) *Attorney, Agent, or Firm* — Dinsmore & Shohl LLP (57) ABSTRACT

A vehicle includes a vehicle panel and a cup holder assembly that is located at the vehicle panel. The cup holder assembly includes an outer housing connected to the panel. A cup holder body has a holder portion that provides at least one receptacle and a drainage portion located adjacent the holder portion moveably connected to the outer housing. The cup holder body is moveable relative to the outer housing between a retracted configuration with the holder portion retracted into the outer housing and an extended configuration with the holder portion extended out of the outer housing to expose the at least one receptacle. The drainage portion includes an upper surface and a liquid relief drain formed in the upper surface that includes a drainage floor that slopes downwardly away from the vehicle panel in a vehicle vertical direction.

20 Claims, 8 Drawing Sheets

CUP HOLDER ASSEMBLIES WITH CUP HOLDER BODIES INCLUDING LIQUID RELIEF DRAINS AND VEHICLES INCORPORATING SAME

TECHNICAL FIELD

The present specification generally relates to cup holder assemblies and, more specifically, to cup holder assemblies including liquid relief drains for vehicles.

BACKGROUND

Cup holder assemblies are often provided in vehicles for providing convenience in transporting a cup or other liquid vessel within the vehicle. The cup holder assemblies may include one or more receptacles that can be used to hold the liquid vessels upright and at a convenient location for accessing the liquid vessels.

In some instances, liquid may unintentionally spill onto the cup holder assemblies. Where the cup holder assemblies are moveable between extended and retracted configurations, the cup holder assembly may carry liquid as the cup holder assembly retracts. This carrying of liquid by the cup holder can potentially expose electronics to the liquid and also affect performance of the cup holder assembly moving between the retracted and extended configurations.

Accordingly, a need exists for cup holder assemblies that include a liquid relief drain that directs fluid away from the cup holder assembly.

SUMMARY

In one embodiment, a vehicle includes a vehicle panel and a cup holder assembly that is located at the vehicle panel. The cup holder assembly includes an outer housing connected to the panel. A cup holder body has a holder portion that provides at least one receptacle and a drainage portion located adjacent the holder portion moveably connected to the outer housing. The cup holder body is moveable relative to the outer housing between a retracted configuration with the holder portion retracted into the outer housing and an extended configuration with the holder portion extended out of the outer housing to expose the at least one receptacle. The drainage portion includes an upper surface and a liquid relief drain formed in the upper surface that includes a drainage floor that slopes downwardly away from the vehicle panel in a vehicle vertical direction.

In another embodiment, a cup holder assembly for a vehicle includes an outer housing and a cup holder body having a holder portion that provides at least one receptacle, an actuation portion and a drainage portion located between the holder portion and the actuation portion that is moveably connected to the outer housing. The cup holder body moveable relative to the outer housing between a retracted configuration with the holder portion retracted into the outer housing and an extended configuration with the holder portion extended out of the outer housing to expose the at least one receptacle. The drainage portion includes an upper surface and a liquid relief drain formed in the upper surface that includes a drainage floor that slopes downwardly toward the holder portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to cup holder assemblies for vehicles that include a liquid relief drain and other liquid relief features that can be used to direct liquids away from the cup holder assemblies. The cup holder assemblies include an outer housing and a cup holder body that is moveably connected to the cup holder assemblies. An actuation mechanism may be provided that can be used to extend and retract the cup holder body into and out of the outer housing. The cup holder body may have a generally flat upper surface. The flat upper surface can provide a location on which liquids can accumulate when the cup holder assembly is in use. The liquid relief drain is provided in the cup holder body that can be used to direct liquid away from the cup holder assemblies.

Figure 1:
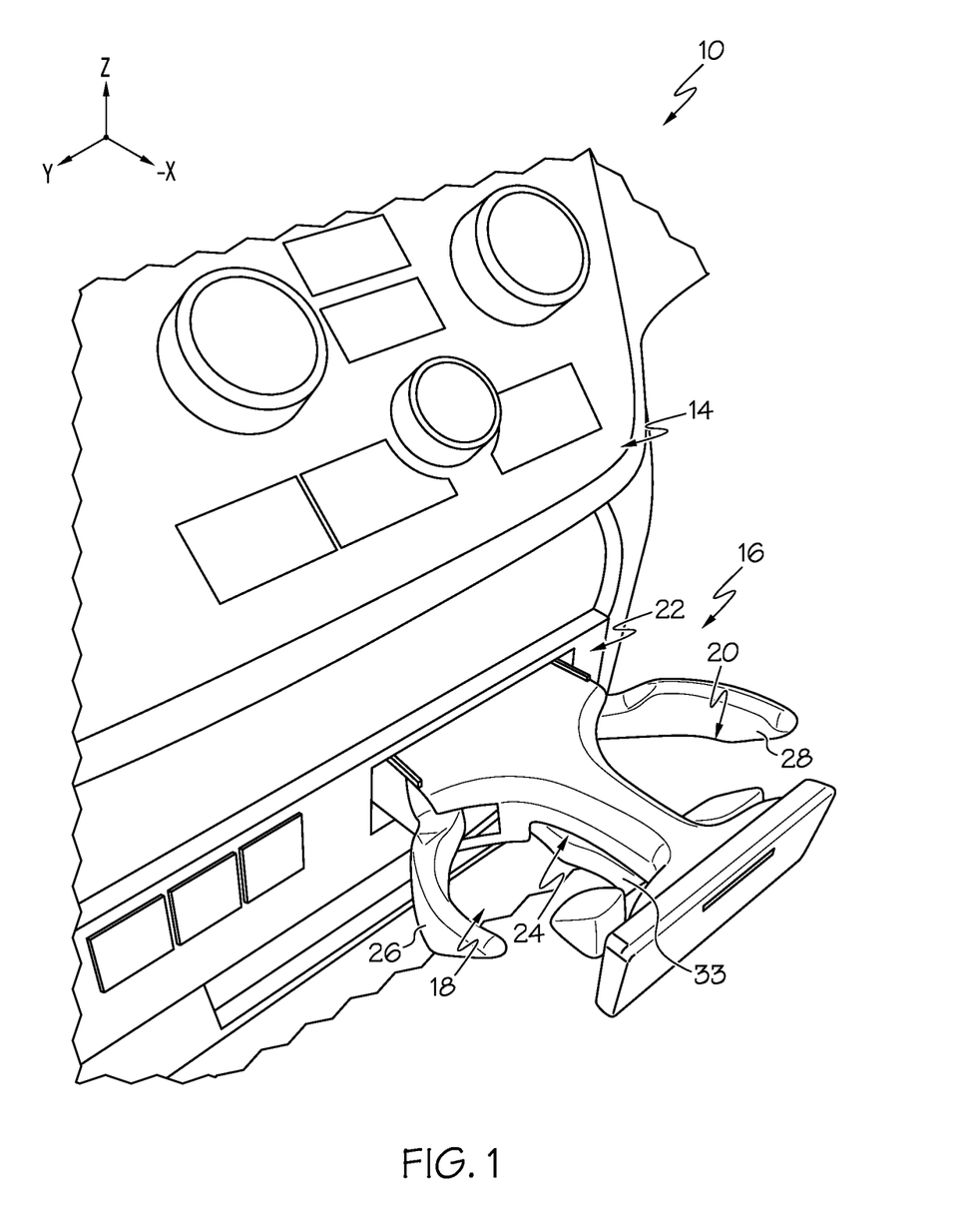
FIG. 1 is a perspective view of an interior of a vehicle including an instrument panel with cup holder assembly in an extended configuration, according to one or more embodiments shown and described herein.

Referring to FIG. 1, an interior view of a vehicle 10 illustrates a dashboard 12, an instrument panel 14 and a cup holder assembly 16 located at the instrument panel 14. In FIG. 1, the cup holder assembly 16 is illustrated in an extended configuration where receptacles 18 and 20 can be accessed by an occupant of the vehicle 10. The cup holder assembly 16 includes an outer housing 22 and a cup holder body 24 that is moveably connected to the outer housing 22. The cup holder body 24 can be moved in a vehicle longitudinal direction between the extended configuration and the retracted configuration. As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1).

The cup holder assembly 16 includes side support arms 26 and 28 that are pivotally connected to the cup holder body 24. With the cup holder body 24 in the extended configuration, the side support arms 26 and 28 may pivot to deployed positions. In some embodiments, the side support arms 26 and 28 may be biased (e.g., by springs) toward the deployed positions to provide the receptacles 18 and 20. The cup holder assembly 16 also includes a bottom support arm 33 that is pivotally connected to the cup holder body 24. With the cup holder body 24 in the extended configuration, the bottom support arm 33 may also pivot to the deployed position. In some embodiments, the bottom support arm 33 may be biased (e.g., by a spring) toward the deployed position to provide a bottom rest for the receptacles 18 and 20.

Figure 2:
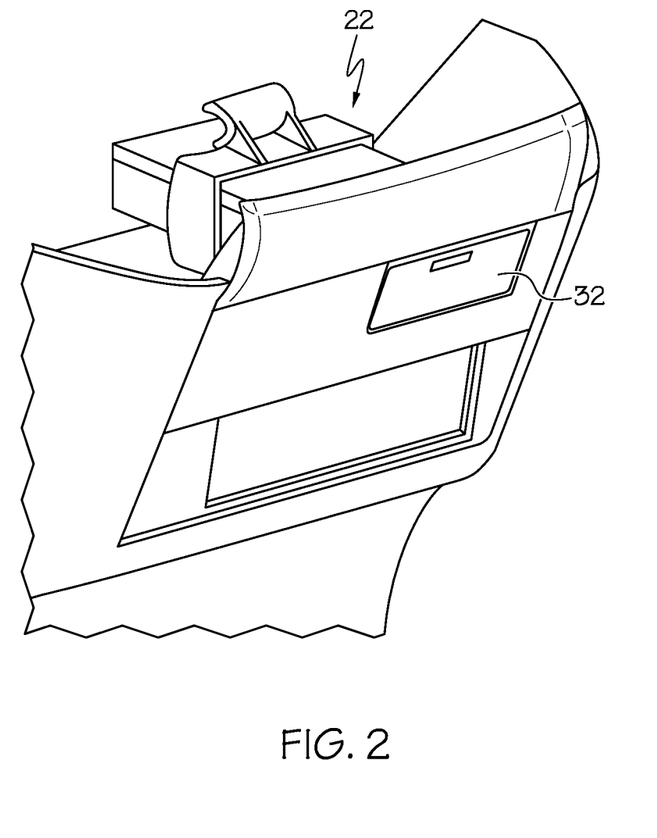
FIG. 2 is a perspective view of the cup holder assembly of FIG. 1 in a retracted configuration, according to one or more embodiments shown and described herein.

Referring briefly to FIG. 2, as the cup holder body 24 retracts into the outer housing 22, the side support arms 26 and 28 and bottom support arm 33 may pivot toward stowed positions to reduce a footprint of the cup holder body 24 in the vehicle lateral direction and to fit into the outer housing 22. A rearward facing surface of the cup holder body 24 is provided by a door panel 32 that can be used in moving the cup holder body 24 between the extended and retracted configurations. As can be seen by FIG. 2, the door panel 32 can also provide an outer surface that can be used to blend the cup holder assembly 16 with the surrounding panels on the dashboard 12.

Figure 3:
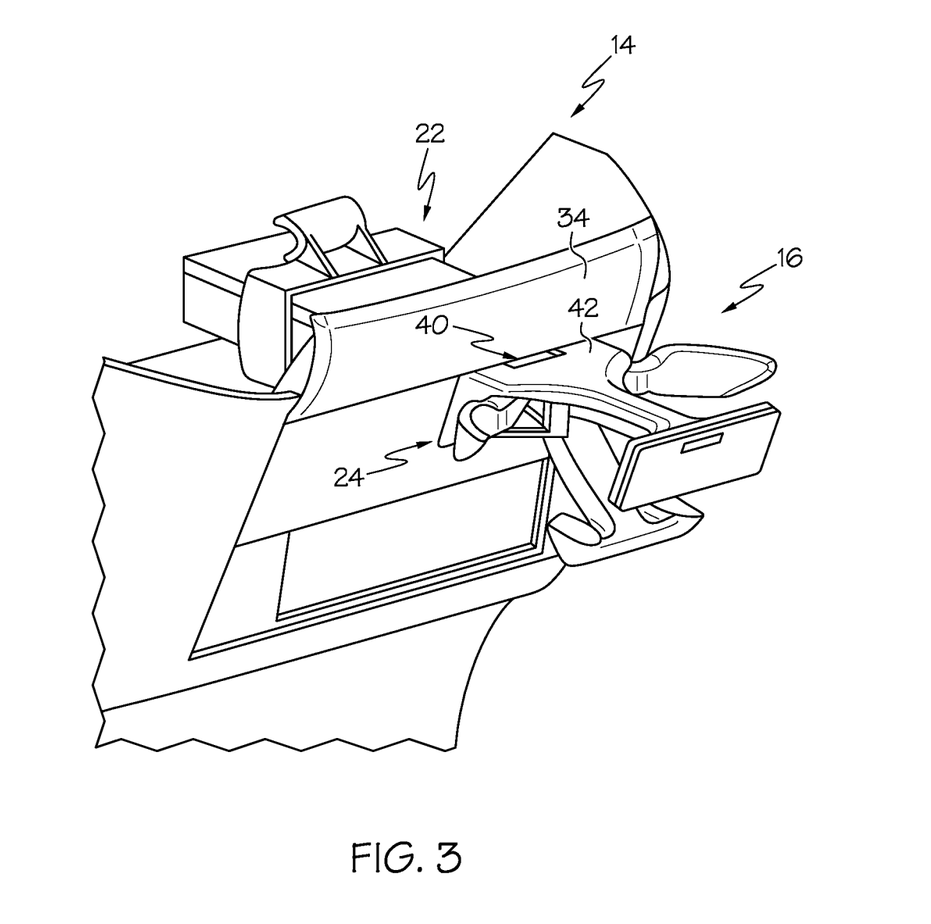
FIG. 3 is a perspective view of the cup holder assembly of FIG. 2 in an extended configuration, according to one or more embodiments shown and described herein.

FIG. 3 illustrates a side, perspective view of the cup holder assembly 16 with cup holder body 24 in the extended configuration. Above the cup holder assembly 16 in the vehicle vertical direction is a trim panel 34. The trim panel 34 may be used to at least partially conceal the outer housing 22 within the instrument panel 14. The trim panel 34 may also be positioned to at least partially conceal a liquid relief drain 40 that is provided in the cup holder body 24 with the cup holder body 24 in the extended configuration. In the illustrated example, the trim panel 34 overhangs at least a portion of the liquid relief drain 40 with the cup holder body 24 in the extended configuration.

Figure 4:
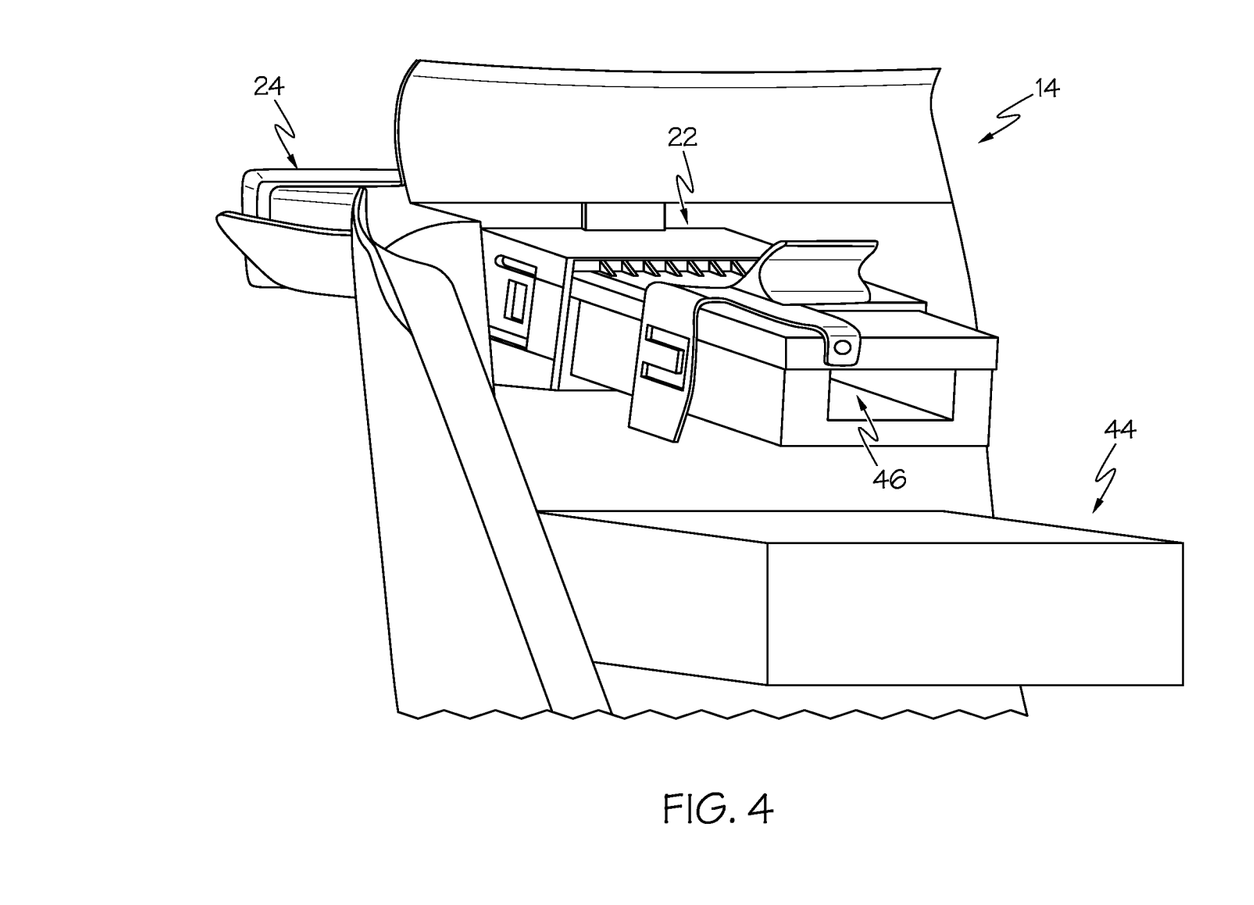
FIG. 4 is in interior view of the instrument panel of FIG. 1, according to one or more embodiments shown and described herein.

As will be described in greater detail below, the liquid relief drain 40 is provided to direct liquid that collects on an upper flat surface 42 of the cup holder body 24 away from the upper flat surface 42 and the instrument panel 14. Such an arrangement of a liquid relief drain 40 can reduce carrying of the liquid into the outer housing 22 and the instrument panel 14 as the cup holder body 24 moves to the retracted configuration. For example, referring to FIG. 4, a simplified interior view of the instrument panel 14 is illustrated. The outer housing 22 may be located above an electronic device 44, such as a radio or DVD player. When the cup holder body 24 carries liquid into the instrument panel 14, liquid may travel to the electronic device 44 and affect operation of the electronic device 44. Additionally, liquid carried into the outer housing 22 may affect operation of the actuator, represented by element 46, that is used to move the cup holder body 24 between the extended and retracted configurations.

Figure 5:
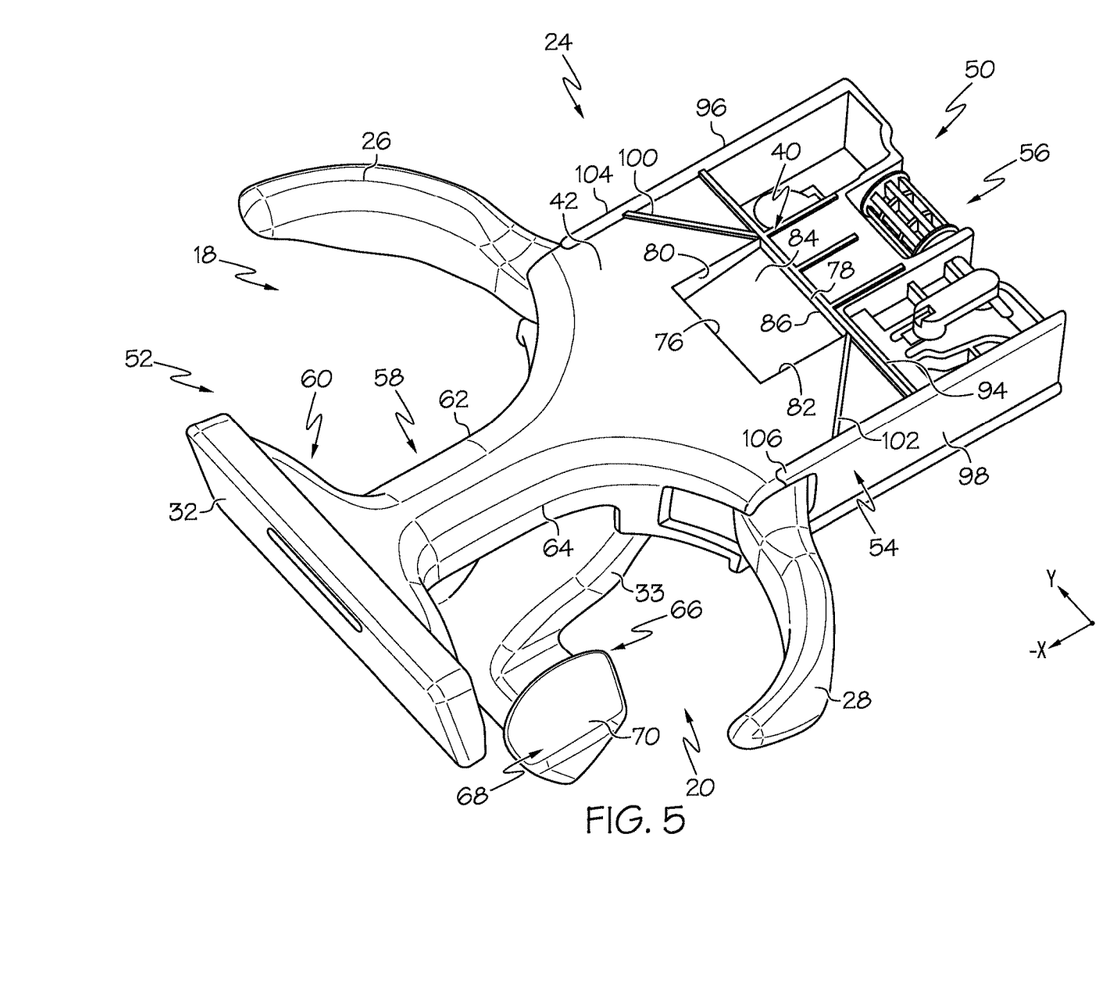
FIG. 5 is a perspective view of a cup holder body for use with the cup holder assembly of FIG. 1, according to one or more embodiments shown and described herein.

Referring now to FIG. 5, a top, perspective view of the cup holder body 24 is shown in isolation without the outer housing 22. The cup holder body 24 includes a forward actuating portion 50, a rearward holder portion 52 and a central drainage portion 54 that is located between the actuating portion 50 and the holder portion 52. The actuating portion 50 is located within the outer housing 22 and may include actuating structures 56, such as wheels, gears, etc. that can be used in extending and retracting the cup holder body 24 between the extended and retracted configurations.

The holder portion 52 extends rearward from the drainage portion 54 and includes a necked-down region 58 of reduced width in the vehicle lateral direction and a handle portion 60 of increased width in the vehicle lateral direction forming a T-shaped holder portion 52. The necked-down region 58 may also have curved sidewalls 62 and 64 that can cooperate with the side support arms 26 and 28 to provide the receptacles 18 and 20 to receive a cup or other container. The door panel 32 is connected to the handle portion 60. The door panel 32 may include a handle, button or other user input that can be used by an occupant to extend and retract the cup holder body 24 out of and into the outer housing 22.

The bottom support arm 33 extends outwardly from the cup holder body 24 in the vehicle longitudinal direction and downwardly in the vehicle vertical direction to a location beneath the receptacles 18 and 20. The bottom support arm 33 includes an arm portion 66 that extends outwardly from the cup holder body 24 and support portions 68 that extend outwardly from the arm portion 66 in the vehicle lateral direction. The support portions 68 include a bottom support surface 70 located beneath the receptacles 18 and 20 that can be used to support a bottom of a cup or other container (e.g., to inhibit the container from falling through the receptacle 18 or 20).

The drainage portion 54 is located between the actuating portion 50 and the holder portion 52. In some embodiments, the drainage portion 54, the actuating portion 50 and the holder portion 52 are all intersected by the same horizontal plane providing a somewhat beam-like cantilevered configuration. The drainage portion 54 includes the upper surface 42 that defines a horizontal, planar area facing a roof of the vehicle 10 that is located forward of the receptacles 18 and 20 in the vehicle longitudinal direction. In the illustrated embodiment, the upper surface 42 extends rearward in the vehicle longitudinal direction to intersect the receptacles 18 and 20 locating the upper surface 42 adjacent the receptacles 18 and 20. As can be appreciated, during use, the drainage portion 54 may receive fluids from containers that are located in the receptacles 18 and 20 due to the proximity of the drainage portion 54 to the receptacles 18 and 20. In this regard, the cup holder body 24 includes the liquid relief drain 40 that extends downward in the vehicle vertical direction from the upper surface 42.

Figure 6:
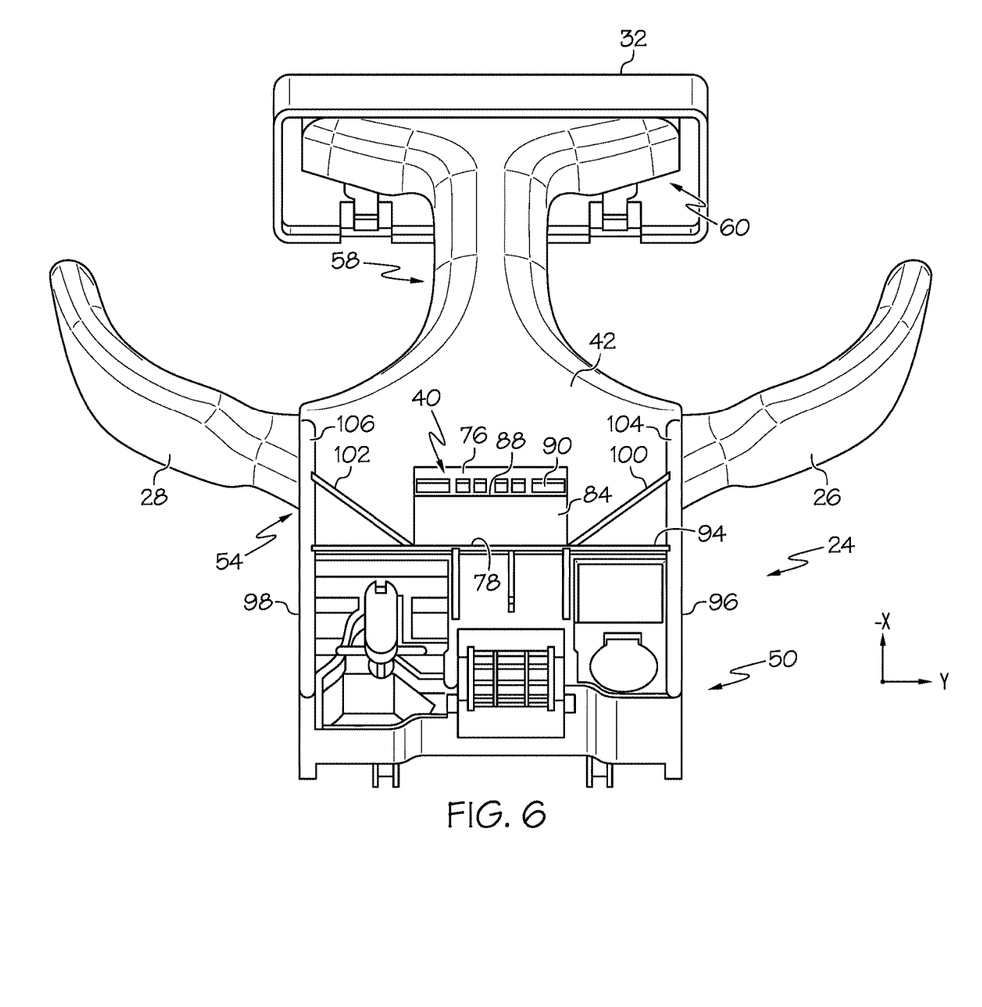
FIG. 6 is a front view of the cup holder body of FIG. 5, according to one or more embodiments shown and described herein.

The liquid relief drain 40 is formed as a ramp-shaped liquid relief structure including a rear wall 76, a front wall 78 and side walls 80 and 82 that extend between the rear wall 76 and the front wall 78. A drainage floor 84 extends from the front wall 78 to the rear wall 76 in a generally downward-sloped fashion with a front edge 86 of the drainage floor 84 being located above a rear edge 88 (FIG. 6) of the drainage floor 84. Referring also to FIG. 6, the drainage floor 84 has a ramp-shape such that liquid flows from the front wall 78 toward the rear wall 76, away from the instrument panel 14 and toward openings 90 provided through the rear wall 76 and being in fluid communication with a cabin of the vehicle 10. In some embodiments, a tray or other receptacle may be provided that receives fluid exiting through the openings 90, for example, which can be periodically emptied.

Referring still to FIGS. 5 and 6, the liquid relief drain 40 is illustrated as being rectangular in shape; however, the liquid relief drain 40 may be any suitable shape, such as rounded, irregular, etc. As described above, the liquid relief drain 40 may be sized and shaped such that the liquid relief drain 40 is not visible with the cup holder assembly 16 in the extended configuration.

In addition to the liquid relief drain 40, other liquid relief structures may be provided. In the example of FIGS. 5 and 6, the drainage portion 54 includes a forward flow directing rib 94 that extends in the vehicle lateral direction between sides 96 and 98 of the cup holder body 24 to serve as a backstop and direct liquid flow toward the liquid relief drain 40. The flow directing rib 94 extends alongside and generally parallel to the front wall 78, extending beyond the front wall 78 in the vehicle lateral direction to the sides 96 and 98. The flow directing rib 94 may be formed monolithic with the upper surface 42, or the flow directing rib 94 may be formed separately and attached to the upper surface 42. In some embodiments, the flow directing rib 94 may be formed of foam, epoxy or other suitable material that is applied to the upper surface 42 and allowed to cure to form the flow directing rib 94.

The drainage portion 54 may also include side flow directing ribs 100 and 102 that extend in both the vehicle lateral direction and the vehicle longitudinal direction to serve as side rails that direct liquid flow toward the liquid relief drain 40. At a rearward end, the flow directing ribs 100 and 102 may intersect the respective sides 96 and 98. At a forward end, the flow directing ribs 100 and 102 may intersect the flow directing rib 94 at opposite side walls 80 and 82 of the liquid relief drain 40. The sides 96 and 98 may also extend upwardly beyond the upper surface 42 in the vehicle vertical direction providing additional flow directing ribs 104 and 106 that extend in the vehicle longitudinal direction.

Figure 7:
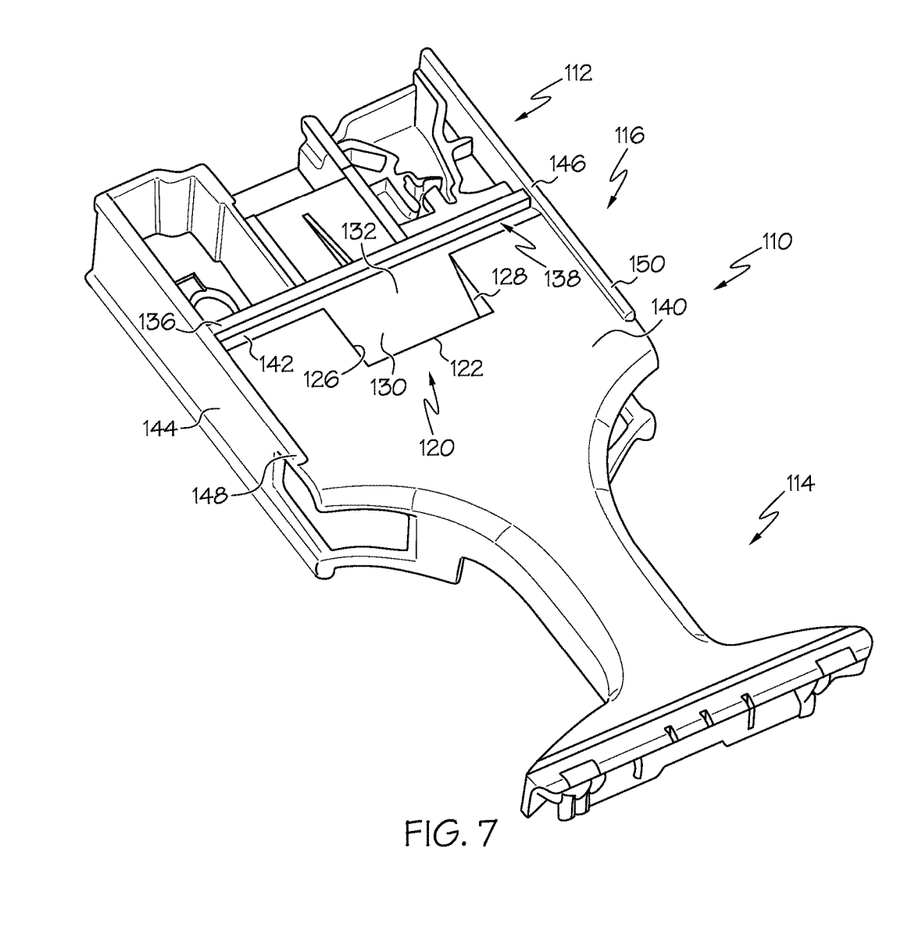
FIG. 7 is a perspective view of another cup holder body for use with the cup holder assembly of FIG. 1, according to one or more embodiments shown and described herein.

Referring to FIG. 7, another embodiment of a cup holder body 110 for use with a cup holder assembly is illustrated. Similar to the cup holder body 24 described above, the cup holder body 110 includes a forward actuating portion 112, a rearward holder portion 114 and a central drainage portion 116 that is located between the actuating portion 112 and the holder portion 114. A liquid relief drain 120 is formed as a ramp-shaped liquid relief structure including a rear wall 122 and side walls 126 and 128. A drainage floor 130 extends to the rear wall 122 in a generally downward-sloped fashion with a front edge 132 of the drainage floor 130 being located above a rear edge of the drainage floor 130. As above, the drainage floor 130 has a ramp-shape such that liquid flows from the front edge 132 toward the rear wall 122, away from the instrument panel and toward openings provided through the rear wall 122 and being in fluid communication with a cabin of the vehicle.

In this embodiment, a forward flow directing rib 136 extends in the vehicle lateral direction between sides 144 and 146 of the cup holder body 110 to serve as a backstop and direct liquid flow toward the liquid relief drain 120. Another liquid relief structure in the form of a channel or flow directing gutter 138 extends alongside the flow directing rib 136 in the vehicle lateral direction and is capable of fluid communication with the liquid relief drain 120. In particular, the flow directing gutter 138 may be recessed from a flat upper surface 140 of the drainage portion 116. The drainage floor 130 may intersect the flow directing gutter 138 at the front edge 132 to provide a flow path from the flow directing gutter 138 toward the openings in the rear wall 122. In some embodiments, the front edge 132 of the drainage floor 130 is flush with a gutter floor 142. Sides 144 and 146 may also extend upwardly beyond the upper surface 140 in the vehicle vertical direction providing additional flow directing ribs 148 and 150 that extend in the vehicle longitudinal direction.

Figure 8:
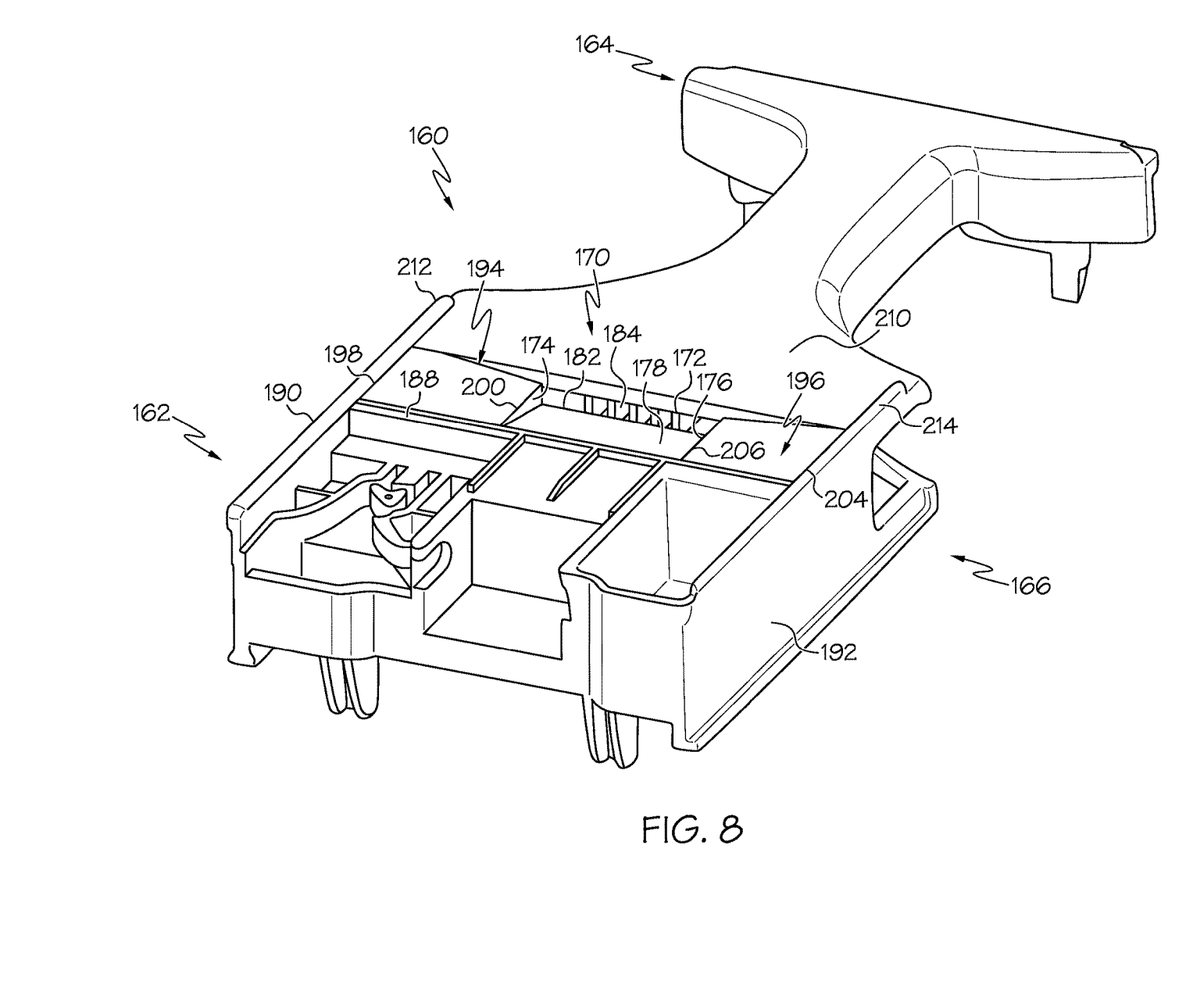
FIG. 8 is a perspective view of another cup holder body for use with the cup holder assembly of FIG. 1, according to one or more embodiments shown and described herein.

Referring to FIG. 8, another embodiment of a cup holder body 160 for use with a cup holder assembly is illustrated. Similar to the cup holder body 24 and cup holder body 110 described above, the cup holder body 160 includes a forward actuating portion 162, a rearward holder portion 164 and a central drainage portion 166 that is located between the actuating portion 162 and the holder portion 164. A liquid relief drain 170 is formed as a ramp-shaped liquid relief structure including a rear wall 172 and side walls 174 and 176. A drainage floor 178 extends to the rear wall 172 in a generally downward-sloped fashion with a rear edge 182 of the drainage floor 178 being located below a front edge of the drainage floor 130. As above, the drainage floor 178 has a ramp-shape such that liquid flows from the front edge toward the rear wall 172, away from the instrument panel and toward openings 184 provided through the rear wall 172 and being in fluid communication with a cabin of the vehicle.

In this embodiment, a forward flow directing rib 188 extends in the vehicle lateral direction between sides 190 and 192 of the cup holder body 160 to serve as a backstop and direct liquid flow toward the liquid relief drain 170. Another liquid relief structure in the form of a side flow directing ramps 194 and 196 lead toward the drainage floor 178 of the liquid relief drain 170. Flow directing ramp 194 includes an outboard edge 198 at the side 190 and an inboard edge 200 at the drainage floor 178 that is lower than the outboard edge 198 in the vehicle vertical direction forming a ramp-shaped liquid relief structure leading toward the drainage floor 178. Likewise, flow directing ramp 196 includes an outboard edge 204 at the side 192 and an inboard edge 206 at the drainage floor 178 that is lower than the outboard edge 204 in the vehicle vertical direction forming another ramp-shaped liquid relief structure leading toward the drainage floor 178. Sides 190 and 192 may also extend upwardly beyond upper surface 210 in the vehicle vertical direction providing additional flow directing ribs 212 and 214 that extend in the vehicle longitudinal direction.

Embodiments described herein are directed to cup holder assemblies and vehicles that include cub holder assemblies that include liquid relief structures that reduce amounts of liquid that may be carried back into the cup holder assemblies after use. The cup holder assemblies may include an outer housing and a cup holder body that is extendable out of and retractable into the outer housings between extended and retracted configurations. In the extended configuration, the cup holder body provides receptacles that can receive containers. The cup holder body includes a liquid relief drain formed as a ramp-shaped liquid relief structure that can carry liquids in a rearward direction away from an instrument panel located at a front of the vehicles due to the shape of the ramp decreasing in elevation toward the rear of the vehicle. The cup holder body may also include other liquid relief structures, such as flow directing ribs and flow directing gutter. The cup holder body including the liquid relief drain, the flow directing ribs and flow directing gutter may be formed as a monolithic, single structure (e.g., by molding).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle panel; and
a cup holder assembly that is located at the vehicle panel, the cup holder assembly comprising:
an outer housing connected to the vehicle panel; and
a cup holder body moveably connected to the outer housing having a holder portion that provides at least one receptacle and a drainage portion located adjacent the holder portion, the cup holder body moveable relative to the outer housing between a retracted configuration with the holder portion retracted into the outer housing and an extended configuration with the holder portion extended out of the outer housing to expose the at least one receptacle, the drainage portion including an upper surface and a liquid relief drain formed in the upper surface that includes a drainage floor that slopes downwardly away from the vehicle panel in a vehicle vertical direction.

2. The vehicle of claim 1, wherein the vehicle panel is an instrument panel located at a dashboard.

3. The vehicle of claim 2, wherein an electronic device is located below the cup holder assembly and behind the instrument panel.

4. The vehicle of claim 1, wherein the drainage floor has a front edge and a rear edge, the front edge located relatively closer to the vehicle panel than the rear edge, the front edge located above the rear edge in the vehicle vertical direction.

5. The vehicle of claim 4, wherein the liquid relief drain includes a rear wall including at least one opening for egress of liquid from the liquid relief drain.

6. The vehicle of claim 1, wherein the drainage portion includes a flow directing rib projecting outwardly from the upper surface that extends in a vehicle lateral direction between opposite sides of the cup holder body at a location forward of the liquid relief drain.

7. The vehicle of claim 6, wherein the flow directing rib is a front flow directing rib, the drainage portion including a side projecting rib projecting outwardly from the upper surface that extends in both the vehicle lateral direction and a vehicle longitudinal direction, the side projecting rib including a rearward end that intersects one of the sides of the cup holder body and a forward end that intersects the front flow directing rib at a side of the liquid relief drain.

8. The vehicle of claim 7, wherein the side projecting rib is a first side projecting rib, the drainage portion including a second side projecting rib projecting outwardly from the upper surface that extends in both the vehicle lateral direction and the vehicle longitudinal direction, the second side projecting rib including a rearward end that intersects the other of the sides of the cup holder body and a forward end of the second side projecting rib that intersects the front flow directing rib at an opposite side of the liquid relief drain.

9. The vehicle of claim 6, wherein the drainage portion includes a flow directing gutter that extends alongside the flow directing rib between opposite sides of the cup holder body at a location between the liquid relief drain and the flow directing rib.

10. The vehicle of claim 6, wherein the drainage portion includes a flow directing ramp located at a side of the liquid relief drain that slopes downwardly in the vehicle vertical direction toward the drainage floor.

11. The vehicle of claim 10, wherein the flow directing ramp is a first flow directing ramp, the drainage portion including a second flow directing ramp located at an opposite side of the liquid relief drain that slopes downwardly in the vehicle vertical direction toward the drainage floor.

12. A cup holder assembly for a vehicle comprising:
an outer housing; and
a cup holder body that is moveably connected to the outer housing having a holder portion that provides at least one receptacle, an actuation portion and a drainage portion located between the holder portion and the actuation portion, the cup holder body moveable relative to the outer housing between a retracted configuration with the holder portion retracted into the outer housing and an extended configuration with the holder portion extended out of the outer housing to expose the at least one receptacle, the drainage portion including an upper surface and a liquid relief drain formed in the upper surface that includes a drainage floor that slopes downwardly toward the holder portion.

13. The cup holder assembly of claim 12, wherein the drainage floor has a front edge and a rear edge, the front edge located relatively closer to the actuation portion than the rear edge, the front edge located above the rear edge.

14. The cup holder assembly of claim 13, wherein the liquid relief drain includes a rear wall including at least one opening for egress of liquid from the liquid relief drain.

15. The cup holder assembly of claim 12, wherein the drainage portion includes a flow directing rib projecting outwardly from the upper surface that extends laterally between opposite sides of the cup holder body at a location between the liquid relief drain and the actuation portion.

16. The cup holder assembly of claim 15, wherein the flow directing rib is a front flow directing rib, the drainage portion including a side projecting rib projecting outwardly from the upper surface that extends both laterally and longitudinally, the side projecting rib including a rearward end that intersects one of the sides of the cup holder body and a forward end that intersects the front flow directing rib at a side of the liquid relief drain.

17. The cup holder assembly of claim 16, wherein the side projecting rib is a first side projecting rib, the drainage portion including a second side projecting rib projecting outwardly from the upper surface that extends both laterally and longitudinally, the second side projecting rib including a rearward end that intersects the other of the sides of the cup holder body and a forward end of the second side projecting rib that intersects the front flow directing rib at an opposite side of the liquid relief drain.

18. The cup holder assembly of claim 15, wherein the drainage portion includes a flow directing gutter that extends alongside the flow directing rib between opposite sides of the cup holder body at a location between the liquid relief drain and the flow directing rib.

19. The cup holder assembly of claim 15, wherein the drainage portion includes a flow directing ramp located at a side of the liquid relief drain that slopes downwardly toward the drainage floor.

20. The cup holder assembly of claim 19, wherein the flow directing ramp is a first flow directing ramp, the drainage portion including a second flow directing ramp located at an opposite side of the liquid relief drain that slopes downwardly toward the drainage floor.

* * * * *